June 12, 1956  J. H. MERRIAM  2,750,354
SELECTIVE PHENOL-ALDEHYDE RESINIFICATION
Filed Sept. 1, 1953  2 Sheets-Sheet 1
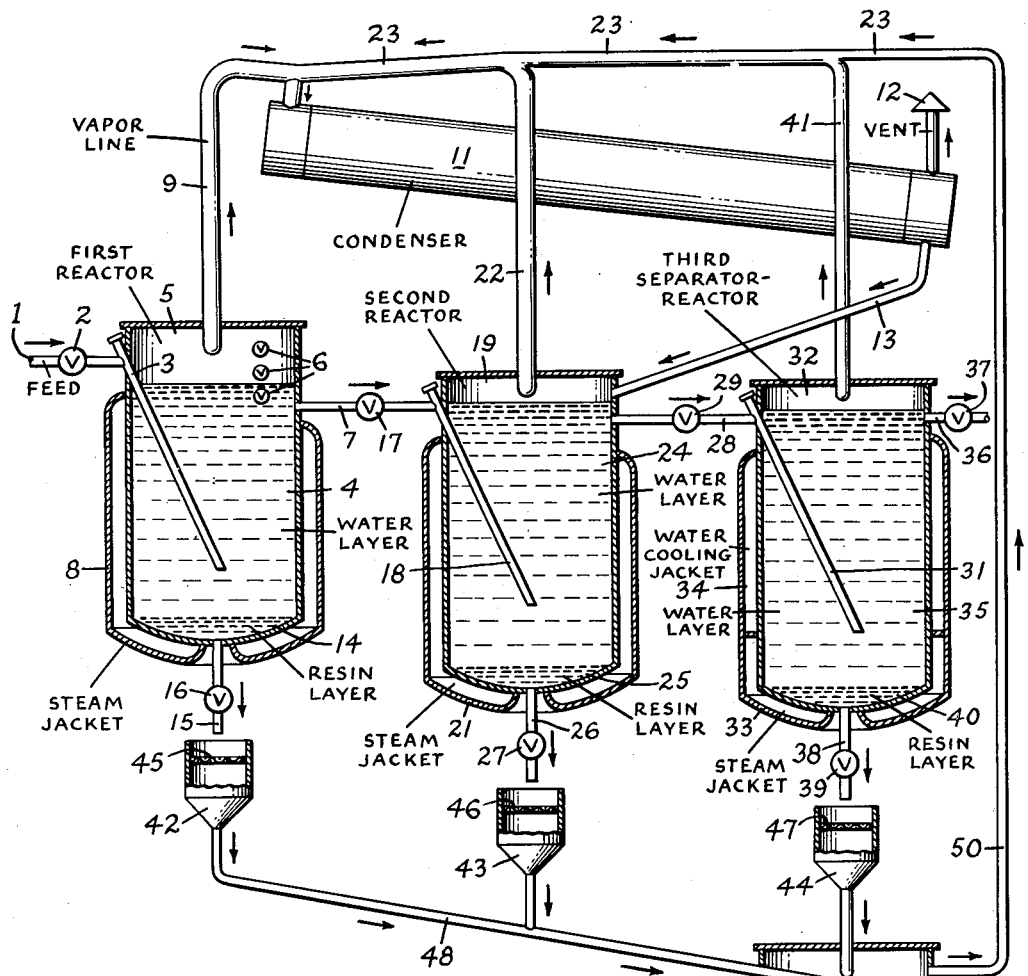
FIG.I.
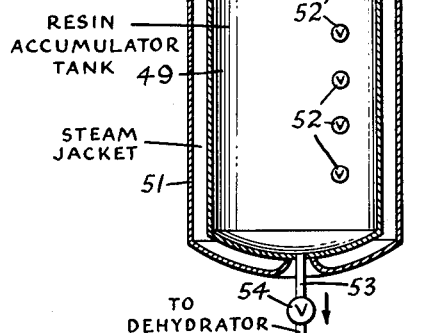
INVENTOR.
JOHN H. MERRIAM
BY
ATTORNEY.

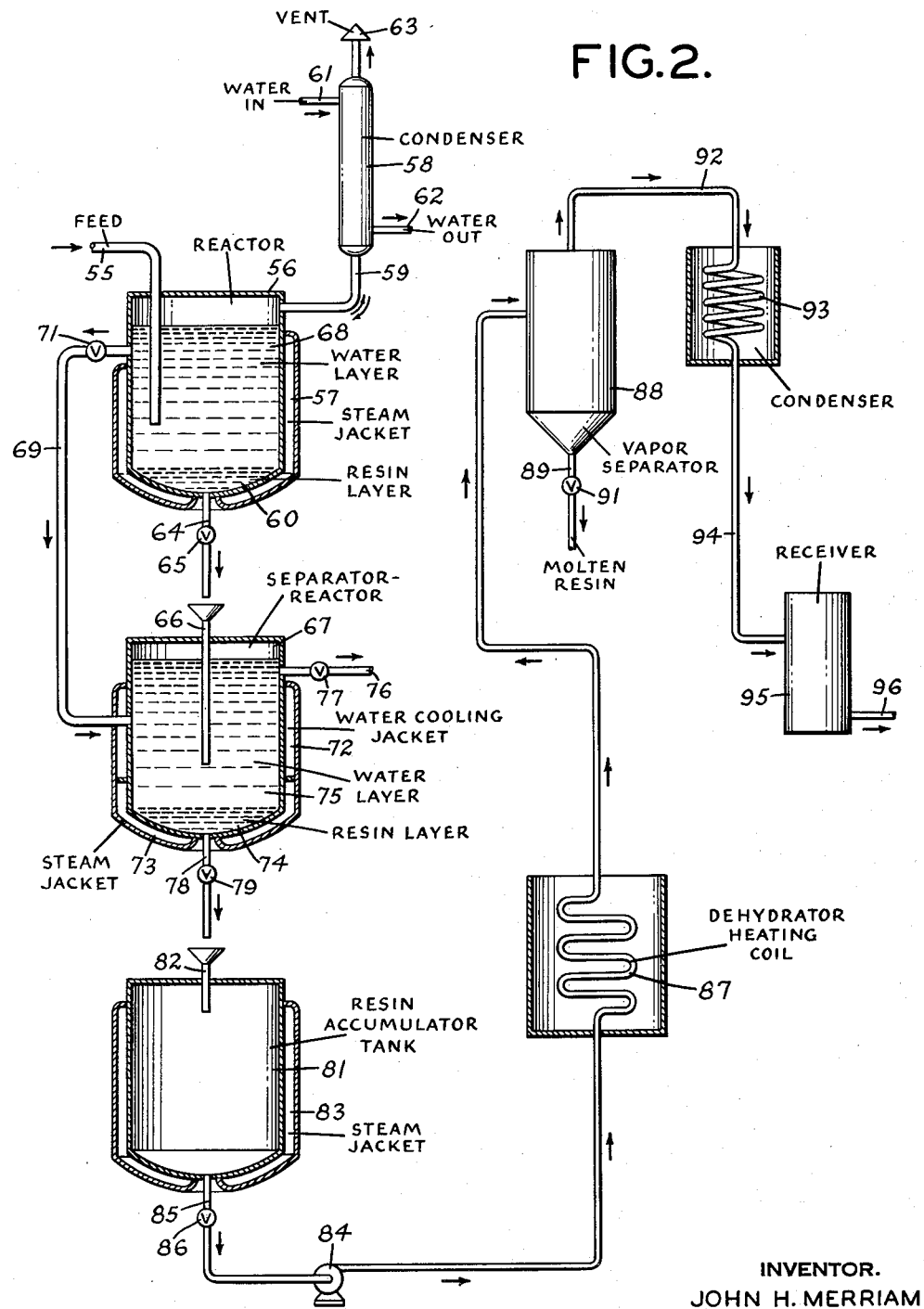

United States Patent Office 2,750,354
Patented June 12, 1956

2,750,354

SELECTIVE PHENOL-ALDEHYDE RESINIFICATION

John H. Merriam, Cheltenham Township, Montgomery County, Pa., assignor to Allied Chemical & Dye Corporation, New York, N. Y., a corporation of New York Application September 1, 1953, Serial No. 377,833

8 Claims. (Cl. 260—57)

This invention relates to the production of phenoplasts and more particularly refers to a new and improved method for selectively condensing a phenol with an aldehyde to produce synthetic resins.

The most common commercial method of manufacturing phenoplasts is by heating a batch of phenol and formaldehyde with agitation in a large kettle until the desired condensation is completed. In this batch method of operation the reactants, phenol and formaldehyde, together with the products of reaction remain in the kettle until completion of the reaction, that is, until the reaction is terminated. As is well known in the art the condensation of all the phenol molecules with all the formaldehyde molecules does not occur at any single time but rather there is a condensation of some of the phenol molecules with the formaldehyde molecules at the start of the reaction and additional molecules of phenol and formaldehyde continue to condense throughout the reaction which in the case of the batch operation may be 2 to 10 hours. Thus, certain phenol-formaldehyde molecules initially formed may be subjected to reaction conditions for 10 hours and phenolformaldehyde molecules which form at the tail end of the reaction period may be in the reaction zone only one minute or less. Obviously other phenol-formaldehyde molecules will be subjected in the reaction zone to intermediate periods of times varying from say less than 10 hours to more than 1 minute. Further, the phenol-formaldehyde molecules which are first formed may react with additional formaldehyde molecules or additional phenol molecules or with similar phenol-formaldehyde molecules. Consequently, whenever a batch of phenol and formaldehyde is heated for a fixed period of time the resultant product is a mixture of different molecules of varying molecular weight, certain of which molecules are undercondensed and other molecules which are overcondensed to a molecular weight higher than desired. Frequently these high molecular weight molecules form clots of viscous resin causing difficulty in the operation and loss of yield of desired product.

A method for continuously resinifying phenol and formaldehyde has been suggested in Patent 2,616,872 of November 4, 1952, by continuously passing phenol and formaldehyde through a plurality of reaction vessels wherein the contents under constant agitation to maintain a homogeneous mass are heated to effect condensation. In this type of continuous operation, just as in the batch operation, the reactants together with the reaction products are subjected in admixture to reaction conditions for a fixed length of time. Consequently, the reaction products are a mixture of phenol-formaldehyde molecules of widely varying molecular weight.

In application Serial No. 254,016 filed October 31, 1951, and now U. S. Patent 2,658,054 issued November 3, 1953, is described a continuous method for producing phenoplasts by passing phenol and formaldehyde through a heated coil. Here again a mixture of reactants together with reaction products are subjected during its travel through the coil to a fixed time resulting in the production of a resinous product composed of molecules of varying molecular weight.

One object of the present invention is to provide a method of reacting a phenol with an aldehyde to produce a resin of more uniform molecular weight.

Another object of this invention is to provide an improved process for producing phenoplasts while avoiding overcondensation and undercondensation inherent in the prior art processes.

A further object of the invention is to provide an efficient continuous process for the production of phenoplasts in a chamber-reactor system.

Further objects and advantages will be apparent from the description and the accompanying drawings.

Generally, the present invention involves heating a mixture of phenol and aldehyde in a reaction zone to continuously effect formation of resin of desired molecular weight, continuously separating said resin as it forms in the reaction zone, and selectively removing said resin from the reaction zone before overcondensation of the resin occurs.

More specifically, the invention comprises maintaining a liquid body of a phenol and an aldehyde in a reaction vessel at an elevated temperature to effect reaction of the phenol and aldehyde to continuously form resin molecules of desired higher molecular weight and density greater than the reactants, maintaining said body in a quiescent state to permit continuous settling of the more dense higher molecular weight resin molecules as they are formed into a lower layer of resin in the bottom of the reaction vessel, and withdrawing said resin of desired molecular weight in the lower layer from the reaction vessel before substantial further reaction of said resin molecules to produce resin molecules of undesirable higher molecular weight occurs.

A preferred method of carrying out process of the present invention involves continuously introducing a phenol and an aldehyde into a large body of liquid containing said phenol and aldehyde reactants, maintaining said body of liquid in an enlarged vertical reaction vessel at a temperature sufficient to effect condensation of phenol and aldehyde and concomitantly water therein to continuously form resin molecules of higher molecular weight and density greater than the reactants, maintaining said body in a quiescent state to permit continuous settling of the more dense higher molecular weight resin molecules as they are formed into a lower liquid layer of resin and an upper aqueous layer in the reaction vessel, continuously withdrawing the lower resin layer from the reaction zone at a rate to maintain only a small lower layer relative to the volume of upper aqueous layer in the reaction zone thereby preventing substantial further reaction of the resin molecules to produce resin molecules of undesirable higher molecular weight, continuously passing said aqueous upper layer into a second enlarged vertical separator-reaction vessel containing a body of liquid wherein unreacted phenol and aldehyde from the upper layer in the first reaction zone are condensed to produce additional resin, maintaining said body of liquid in said separator-reaction vessel in a quiescent state to permit continuous settling of the more dense higher molecular weight molecules as they are formed into a lower layer of resin in the bottom of the separator-reaction vessel and an upper aqueous layer, passing the lower layer of resin containing admixed therewith some aqueous solution containing unreacted phenol and aldehyde from the first reaction vessel into the separator-reaction vessel wherein separation occurs with the resin settling to the bottom in the lower resin layer and the aqueous solution forming an upper aqueous layer, continuously discharging a stream of upper aqueous layer from the top of separator-reaction vessel, continuously withdrawing resin layer from the bottom of the separator-reaction vessel before substantial further reaction of said resin molecules to produce resin molecules of undesirable higher molecular weight occurs, and dehydrating said withdrawn resin to remove water admixed therewith.

One specific embodiment of the present invention comprises maintaining a plurality of reaction vessels, each reaction vessel containing an aqueous body of phenol and formaldehyde at a temperature sufficient to effect condensation of phenol and formaldehyde to continuously form resin molecules of high molecular weight and density greater than the reactants, maintaining said bodies in a quiescent state to permit continuous settling of the more dense higher molecular weight resin molecules as they are formed into lower liquid layers of resin and upper aqueous layers in the reaction vessels, continuously introducing a phenol and an aldehyde into the first reaction vessel, continuously passing upper aqueous layer from each reaction vessel to the succeeding reaction vessel, continuously discharging upper aqueous layer from the last reaction vessel, continuously withdrawing said resin in the lower layers from the reaction vessels before substantial further reaction of said resin molecules to produce resin molecules of undesirable higher molecular weight occurs, and dehydrating said withdrawn resin to remove water admixed therewith.

Figure 1 is a diagrammatic flow sheet illustrating one method of carrying out the process of the present invention. Figure 2 illustrates another method of carrying out the invention.

The process of the present invention is directed to the production of phenoplasts for use as molding compositions, laminates, adhesives, surface coating materials and the like which result from condensation of a phenol and an aldehyde in the presence of a catalyst upon the application of heat. The phenolic reactant may be phenol or homologues of phenol or mixtures of phenols designoted in industry as tar acids and containing phenol, cresols and xylenols. The aldehydes may be those commonly employed in industry for the manufacture of phenoplasts and include for example formaldehyde, paraformaldehyde, acetaldehyde and furfural. Formalin, a 37% solution of formaldehyde in water, is a commercial product often used as the aldehyde reactant. In some instances alcohol solutions of formaldehyde are employed. Various catalysts which produce resin layers in condensing phenol and aldehyde may be employed as for example sulfuric acid, oxalic acid, and ammonium hydroxide. The condensation reactions occur in the presence of water as a result of splitting off of water during the reaction and the introduction of water with the charging materials in the form of aqueous solutions. In the production of special resins such as varnishes, pigmented molding resins, certain additives as for example, drying oils and pigments, may be added to the phenol, aldehyde, catalysts reactants. The type of resin produced by the process will depend as understood in the art on reactants employed, mol ratio of the reactants, catalysts, temperature, pressure and time.

A three-stage operation illustrated in Figure 1 for producing phenol-formaldehyde resin will now be described.

A typical charging material to produce molding resin consisting of a mixture of phenol and a 37% aqueous solution of formaldehyde in the proportion of 5 mols of formaldehyde to 6 mols of phenol together with about ½% sulfuric acid by weight of phenol is introduced through line 1, valve 2 through downcomer pipe 3 into the lower portion of water layer 4 contained in first reactor 5. The size of reactor 5 will of course vary with capacity desired. A convenient commercial size chamber is about 5 feet in diameter and 8 feet high having a volume of approximately 1,000 gallons. The feed mix entering through line 1 will ordinarily be at the rate of 100–125 pounds per hour per cubic foot of reactor volume, or stated in terms of resin production, at the rate of about 50–70 pounds of phenolic resin per cubic foot of reactor. Since the body of liquid in chamber 5 is in a relatively quiescent state the chamber may be filled wtih liquid to about 80% of its volumetric capacity, that is, it may contain about 800 gallons of liquid. Gate valves 6 having liquid level lines attached thereto may be periodically opened to determine the liquid level and also to make certain line 7 and valve 17 is unobstructed. The proper liquid level may be maintained by regulating the amount of feed entering through line 1 and the amount of liquid withdrawn through line 7. Surrounding first reactor 5 is a jacket 8 into which a heating medium, steam, is introduced to bring the reaction mass to temperature during start-up period and thereafter maintain the liquid contents of the vessel at the desired condensing temperature.

When operating at atmospheric pressure, the reactants will readily condense at a temperature of about 95–100° C. Higher reaction temperatures may be employed but generally such operation requires superatmospheric pressure necessitating heavier more expensive equipment. Except for special instances, appreciably lower reaction temperatures are undesirable in that they slow down the reaction and require cooling by vacuum or by cooling surfaces. During the course of the reaction some gases and vapors are liberated and rise from the top of chamber 5 up through vapor line 9 into conventional water cooled condenser 11 from which uncondensed gases are vented through line 12, and liquid condensate containing some unreacted phenol and formaldehyde returns via line 13 for further reaction. Ordinary vapor line 9 is uninsulated resulting in air cooling and condensing of some of the vapors which drop back down through line 9 into the body of liquid formed. The return of this cooled condensate aids in maintaining temperature control of the body of liquid in chamber 5. If the condensate dropping down through vapor line 9 is inadequate in amount some condensate from line 13 (not shown in the drawing) may be directed to chamber 5. Additionally, vent 12 may be connected to a vacuum pump, particularly when operating at low reaction temperatures, to induce vaporization and return of adequate cooled condensate to aid in maintaining a constant temperature in the reaction zone.

The condensation of phenol and formaldehyde is not an instantaneous reaction but rather a gradual reaction, i. e. when a mixture of phenol and formaldehyde are brought to reaction temperature all the phenol and formaldehyde molecules do not react in one instant but first some phenol and formaldehyde molecules will react and then at a later time others, and at a still later time additional phenol and formaldehyde molecules will react until substantially all of the phenol and formaldehyde molecules have been condensed. For example, to accomplish reaction of 90–95% of the phenol and formaldehyde molecules of such mixture as is conventional in the art may require a period of time of from roughly 2 to 10 hours. However, the phenol-formaldehyde condensate molecules formed at the start of the reaction period remain in the reaction zone in the presence of phenol and formaldehyde and react further with phenol and formaldehyde or with other phenol-formaldehyde molecules to produce molecules of undesired higher molecular weight—in fact, quite often form solid clots of resin. Some of the phenol-formaldehyde molecules formed during the latter part of the reaction period are incompletely condensed.

The present invention is particularly directed to the selective reaction of phenol and formaldehyde which encompasses the separation of phenol-formaldehyde molecules of desired molecular weight as they are formed in a separate layer in the reaction zone and the removal of such molecules before they react further to an undesirable high molecular weight. Separation of the molecules of resin of the desired molecular weight as they are formed in vessel 5 is accomplished by maintaining the body of liquid in a quiescent state to permit the heavier molecules of resin as they are formed to settle to the bottom of chamber 5 forming a resin layer 14. It is important to the success of the present operation to avoid violent agitation of the body of liquid in chamber 5 to cause dispersion of the resinous material throughout the mass and produce a homogeneous mixture. Thus mechanical stirrers which induce violent agitation should be avoided. In practice we have found that under operating conditions bubbles of vapor are generated in the body of the liquid which causes a mild movement of the liquid, but such mild movement does not prevent settling of the resin in lower layer at the bottom of the reaction vessel. The degree of reaction to produce desired kind and size phenol-formaldehyde molecule will depend on the operating conditions such as time and temperature, mol ratio of reactants and kind and amount of catalyst. The resin settling in the bottom of chamber 5 and forming a lower layer 14 therein is discharged through line 15 and valve 16 at a rate sufficient to reduce residence time of resin in the reaction zone to prevent the resin from becoming overcondensed. Ordinarily the maintenance of a resin layer of about 2 to about 6 inches in height will give satisfactory operation and avoid any substantial formation of resin of undesirably high molecular weight. In this regard I have noted that resin molecules tend to react most readily with formaldehyde, to a lesser extent with phenol and an even lesser extent with another resin molecule. Consequently separating resin in a lower layer as described herein minimizes the tendency of the resin to react with formaldehyde with the formation of unduly large molecules as compared to an operation wherein the reaction mixture is violently agitated and the resin continuously and intimately mixed with unreacted formaldehyde. In some cases it may be desired to body the resin, that is, increase its viscosity somewhat, in which event the resin would be retained in the reaction zone for a little longer period of time by maintaining a higher resin level. Samples of resin discharging through line 15 may be periodically tested to make certain the resin is of the desired quality. Another method of assuring continuous rapid removal of resin layer from the bottom of the chamber, (not shown in the drawing) is by extending a dip pipe down through chamber 5 with the open end of the dip pipe disposed at a point adjacent the bottom of chamber 5, say about 2 inches from the bottom, thereby maintaining a minimum resin layer at the bottom of the chamber by causing the resin as it settles to the bottom of the chamber to discharge up through the dip pipe and out of the resin chamber 5. The effluent from the dip pipes containing some aqueous solution admixed with the resin may be directed to another vessel for separation of the resin from the aqueous solution and further reaction if desired of unreacted phenol and formaldehyde contained in the aqueous solution.

The reaction in chamber 5 may be conducted to consume substantially all of the phenol and formaldehyde, that is, over 90% of the phenol and formaldehyde, in which event only one reaction vessel need be employed and the aqueous liquid layer containing minor amounts of phenol and formaldehyde may be discharged through line 7 to waste disposal or for further treatment for recovery of the small amounts of phenol and formaldehyde. Desirably, however, to obtain greater capacity and more complete reaction of the phenol and formaldehyde, the reaction in first reactor 5 is controlled to effect consumption of about 60–80% of the phenol and formaldehyde feed leaving in the upper aqueous layer 4 about 20–40% of unreacted phenol and formaldehyde which then flows, preferably by gravity, through line 7, valve 17, and downcomer pipe 18 into second reactor vessel 19 disposed at a lower elevation than preceding chamber 5. Second reactor 19, similar in construction to first reactor 5, is equipped with steam jacket 21 and a vapor line 22 through which evolved gases and vapors rise and flow down through inclined vapor conduit 23 into condenser 11 from which liquid condensate returns via line 13 to reactor 19. Because of the more dilute concentration of reactants in chamber 19 it is generally desirable to operate the second reactor at a slightly higher temperature than in the first reactor. The reaction products in chamber 19, as in chamber 5, separate into an upper aqueous layer 24 and a lower resin layer 25 which latter discharges through line 26 and valve 27. Aqueous layer 24, containing a relatively small amount of unreacted phenol and formaldehyde, overflows through line 28, valve 29, and through downcomer pipe 31 terminating at a point about 2 feet from the bottom of third separator-reactor vessel 32.

Vessel 32 is similar in construction to vessels 5 and 19 except that vessel 32 may have a divided jacket with the lower section 33 adapted for steam heating the bottom portion of the vessel and the upper section 34 encloses water for cooling the aqueous layer 35 to obtain more effective separation of the resin from the water layer. The aqueous solution containing minor amounts of unreacted phenol and formaldehyde together with residual catalyst is discharged from the top of water layer 35 through line 36 and valve 37 to waste disposal. The resin layer 40 is discharged from the bottom of reactor 32 through line 38 and valve 39. Vapors and gases formed in chamber 32 are released through vapor line 41 and pass down inclined vapor pipe 23 into condenser 11. The temperature in the upper part of chamber 32 will be lower than the bottom part of chamber 32, conveniently the upper part of chamber 32 may be maintained at a temperature 10° to 30° below the temperature in preceding chamber 19 and the bottom part of the chamber 32 may be substantially at the same temperature as chamber 19. Even at these lower temperatures some condensation of the remaining unreacted phenol and formaldehyde will occur.

As is evident the selective condensation reaction operation illustrated in Figure 1 may be carried out in one or a plurality of stages. Generally, for small scale commercial operation with a minimum investment, only one-stage operation need be employed. For larger scale commercial operation with greater throughput two or three stage operations would be more desirable. Although more than three stages may be employed and will more efficiently consume the last traces of phenol and formaldehyde, this advantage is offset by increased investment cost.

Resin layers 14, 25 and 40 discharging through respective lines 15, 26 and 38 are "wet," that is, contain water and should ordinarily be dehydrated before sale. The wet resin flows into funnels 42, 43, 44, through respective screens 45, 46, 47 to trap any dirt or sediment therein, thence down through line 48 into accumulator tank 49 which latter is surrounded by a steam jacket 51 to make certain the resin remains in a fluid state. The primary purpose of accumulator tank 49 is to collect a body of resin to assure a steady supply of resin to the dehydrator. Some separation of water may occur in accumulator tank 49 and therefore valves 52 having bleed lines attached thereto are provided, which valves may be opened to bleed off the water layer thereby imposing a smaller load on the dehydrator. Vapors and gases evolved in tank 49 are released through line 50, thence pass through inclined vapor lines 23 to condenser 11. The resin from the bottom of tank 49 may be directed through line 53 and valve 54 to a dehydrator for removal of water. Various dehydrators may be used, as for example the coil-chamber type described in copending application Serial No. 254,016 filed October 31, 1951, a heated rotating drum and a spray dryer.

The present invention is particularly adapted for continuous operation with continuous flow of charging materials and continuous withdrawal of reaction products;

however, although not preferred, the operation may be conducted in a semi-continuous manner, that is, with intermittent introduction of charging materials and intermittent discharge of reaction products.

Figure 2 diagrammatically illustrates a simplified form of operation for carrying out the process of the present invention. Feed material composed of a mixture of phenol, an aqueous solution of aldehyde, catalyst and, if desired, additive, is continuously fed through line 55 into the lower part of reactor 56 equipped with steam jacket 57 for heating the liquid contents in the reactor to effect continuous resinification of the phenol and aldehyde. The temperature in the reactor may be controlled by means of condenser 58 into which vapors and gases from the top of reactor 56 flow upwardly through vapor line 59 and the vapors condensed by indirect heat exchange with water entering through line 61 and discharging through line 62. Cooled condensate from condenser 58 returns via line 59 to reactor 56. Uncondensed gases and vapors are vented from the system through line 63 at the top of condenser 58. The body of liquid in reactor 56 is maintained in a quiescent state to permit settling of the higher molecular weight more dense resin molecules resulting from the reaction of the aldehyde and phenol to form in a lower layer or resin at the bottom of the chamber. The resin layer 60 admixed with some water is continuously discharged through line 64 and valve 65 into pipe 66 which conducts it into the lower part of the body of liquid in separator-reactor 67 wherein further separation of water from the resin occurs. Water layer 68 is withdrawn from the top of reactor 56 and flows through line 69 and valve 71 into reactor 67 wherein further condensation of the unreacted phenol and aldehyde occurs.

Separator-reactor 67 may be surrounded by a divided jacket, the upper portion constituting a water cooling jacket 72 and the lower portion a steam jacket 73. The effect of cooling the upper water layer by means of cooling water introduced in jacket 72 is to reduce the solubility of the resin in the water and thereby effect better separation. Steam introduced into jacket 73 maintains the resin in a fluid condition and also supplies sufficient heat for effecting continued reaction between unreacted phenol and formaldehyde. The body of liquid in chamber 67 is also maintained in a quiescent state to permit settling of the resin with the formation of a lower resin layer 74 and an upper aqueous layer 75. The aqueous layer containing minor amounts of unreacted phenol and aldehyde is discharged through line 76 and valve 77 near the top of chamber 67 to waste disposal. The resin layer is discharged from the bottom of separator-reactor 67 through line 78 and valve 79 and conducted to resin accumulator tank 81 via pipe 82.

Resin in accumulator tank 81, maintained in a fluid condition by means of steam jacket 83, is forced by pump 84 through line 85 and valve 86 through dehydrator heating coil 87 wherein the resin is heated to an elevated temperature to effect vaporization of the water. The effluent from heating coil 87 is introduced into chamber 88 wherein the liquid resin is separated from the vapors. Molten resin is discharged from the bottom of vapor separator 88 through line 89 and valve 91. Vapors released from the top of vapor separator 88 are passed through line 92 to water cooled condenser 93 and the liquid condensate sent through line 94 and collected in receiver 95. This liquid condensate is principally water which though small in amount relative to the total feed may contain 5–20% of unreacted phenol and aldehyde in solution and may be recycled via line 96 to form part of the feed mixture entering the system through feed line 55.

The following examples illustrate the present invention.

*Example 1*

The charging stock to the process is prepared by mixing U. S. P. phenol, a 37% aqueous solution of formaldehyde and a 50% sulfuric acid solution in the proportion of 71.2 lbs. 37% formaldehyde and 1.1 lbs. 50% sulfuric acid per 100 lbs. phenol. The feed mixture is continuously fed into a large vertical reaction chamber equipped with a reflux condenser and surrounded by a steam jacket to maintain the temperature of the body of liquid in the reaction chamber which is at a level about ¾ of the height of the reaction chamber. The reaction chamber is operated at atmospheric pressure and at a temperature of about 100° C. The resin is formed by condensation of the phenol and formaldehyde in the reaction chamber which settles to the bottom to form a resin layer which is rapidly withdrawn from the reaction chamber thereby preventing the formation of over-condensed high molecular weight resin. This resin layer is introduced into a second separator-reactor vessel similar to the first at a point well below the liquid level of the body of liquid in the second vessel. The reaction products in the first reactor vessel separate into an upper aqueous layer and a small liquid lower resin layer. The aqueous layer containing about 4% formaldehyde is continuously withdrawn from the top of the first reaction vessel and introduced into a body of liquid in a separator-reactor which has its upper portion surrounded by a water cooling jacket and its lower portion surrounded by a steam jacket. The temperature of the liquid near the top of the separator-reactor chamber is about 85° C. and the temperature of the liquid near the bottom of the chamber is about 98° C. In the separator-reactor chamber further condensation of unreacted phenol and formaldehyde occurs with the formation of additional resin which settles in a lower layer in the bottom of the chamber. The upper aqueous layer discharged from the top of the separator-reactor vessel contains only about 1% formaldehyde and because it is uneconomical to recover formaldehyde from such dilute solutions, the aqueous layer is sent to waste disposal. The waste water discharged from the separator-reactor constitutes about 27% of the weight of the feed mixture. The remaining 63% is withdrawn as resin layer from the bottom of the separator-reactor chamber and collected in an accumulator tank which is steam jacketed to maintain the resin in a fluid condition. The resin in the accumulator tank is "wet," that is, it contains a mixture of about 75% resin and 25% volatiles composed primarily of water, a lesser amount of phenol and a minor amount of aldehyde.

The wet resin in the accumulator tank is dehydrated by passing the wet resin through a steam jacketed elongated coil wherein it is heated to a temperature of 165° C., and the hot effluent from the coil discharged into a vapor separator wherein the dry liquid resin is separated from the vapors and the resin discharged as a liquid product, and the vapors released from the top of the vapor separator and condensed. The condensate resulting from liquefying the vapors contains about 15% phenol and is returned as part of the feed to the process.

The resin product contains less than 1% water, and has melting point of about 90° C. and a cure time at 150° C. of 125 seconds.

Yield of resin based on phenol is 94.8 mol percent.

*Example 2*

In this example the same feed composition and apparatus are employed as in Example 1. The reaction chamber is operated at atmospheric pressure and at a temperature of about 100° C. The rate of feed is higher than in Example 1, and maintained so that the upper aqueous layer discharged from the reaction chamber contains about 6% formaldehyde. This aqueous feed is continuously passed to a second separator-reactor chamber into which is also introduced the lower resin layer withdrawn from the bottom of the first reactor. The second separator-reactor has a temperature near the bottom of about 98° C. and a temperature near the top of about 94° C. The upper aqueous layer discharged to waste disposal from the top of the second separator-reactor vessel contains about 2% formaldehyde. The resin layer from the bottom of the second separator-reactor is sent to an accumulator tank and thence dehydrated in the same manner as described in Example 1.

The resin product produced in Example 2 has less than 1% water, and has a melting point of about 85° C. and a cure time at 150° C. of 140 seconds.

Yield of resin based on phenol is 94.0 mol percent.

Although certain preferred embodiments of the invention have been disclosed for the purpose of illustration, it will be evident that various changes and modifications may be made therein without departing from the scope and spirit of the invention.

I claim:

1. A process for the selective condensation of a phenol and an aldehyde which comprises maintaining a liquid body of a phenol selected from the group consisting of phenol, cresols, xylenols and tar acids and an aldehyde selected from the group consisting of formaldehyde, paraformaldehyde, acetaldehyde, and furfural and a resinification catalyst in a reaction vessel at an elevated temperature of at least 65° C. to condense the phenol and aldehyde to continuously form resin molecules of molecular weight and density greater than the reactants, maintaining said body in a quiescent state to permit continuous settling of the more dense molecules as they are formed into a lower layer of resin in the bottom of the reaction vessel, and withdrawing said resin in the lower layer from the reaction vessel before substantial further reaction of said resin molecules to produce resin molecules of undesirable molecular weight occurs.

2. A process for producing phenoplasts which comprises continuously introducing a phenol selected from the group consisting of phenol, cresols, xylenols and tar acids and an aldehyde selected from the group consisting of formaldehyde, paraformaldehyde, acetaldehyde, and furfural into a large body of liquid containing said phenol and aldehyde reactants and a resinification catalyst, maintaining said body of liquid in an enlarged vertical reaction vessel at an elevated temperature of at least 65° C. to condense phenol and aldehyde therein to continuously form resin molecules of molecular weight and density greater than the reactants, maintaining said body in a quiescent state to permit continuous settling of the more dense resin molecules as they are formed into a lower liquid layer of resin and an upper aqueous layer in the reaction vessel, continuously withdrawing said aqueous upper layer from the reaction vessel, and continuously withdrawing the lower resin layer from the reaction zone at a rate to maintain only a small lower layer relative to the volume of upper aqueous layer in the reaction zone thereby preventing substantial further reaction of the resin molecules to produce resin molecules of undesirable higher molecular weight.

3. A process for producing phenoplasts which comprises continuously introducing a phenol selected from the group consisting of phenol, cresols, xylenols and tar acids and an aldehyde selected from the group consisting of formaldehyde, paraformaldehyde, acetaldehyde, and furfural into a large body of liquid containing said phenol and aldehyde reactants together with a resinification catalyst, maintaining said body of liquid in an enlarged vertical reaction vessel at an elevated temperature from about 65° C. to about 100° C. to effect condensation of phenol and aldehyde therein to continuously form resin molecules of higher molecular weight and density greater than the reactants, maintaining said body in a quiescent state to permit continuous settling of the more dense higher molecular weight resin molecules as they are formed into a lower liquid layer of resin and an upper aqueous layer in the reaction vessel, continuously withdrawing the lower resin layer from the reaction vessel at a rate to maintain only a small lower layer relative to the volume of upper aqueous layer in the reaction vessel thereby preventing substantial further reaction of the resin molecules to produce resin molecules of undesirable higher molecular weight, continuously passing said aqueous upper layer into a second enlarged vertical separator-reaction vessel containing a body of liquid wherein unreacted phenol and aldehyde from the upper layer in the first reaction vessel are condensed to produce additional resin, maintaining said body of liquid in said separator-reaction vessel in a quiescent state to permit continuous settling of the more dense higher molecular weight molecules as they are formed into a lower layer of resin in the bottom of the separator-reaction vessel and an upper aqueous layer, continuously discharging upper aqueous layer from the separator-reaction vessel, and continuously withdrawing resin layer from the bottom of the separator-reaction vessel before substantial further reaction of said resin molecules to produce resin molecules of undesirable higher molecular weight occurs.

4. A process for producing phenoplasts which comprises continuously introducing a phenol selected from the group consisting of phenol, cresols, xylenols and tar acids and an aldehyde selected from the group consisting of formaldehyde, paraformaldehyde, acetaldehyde, and furfural into a large body of liquid containing said phenol and aldehyde reactants and a resinification catalyst, maintaining said body of liquid in an enlarged vertical reaction vessel at an elevated temperature from about 65° C. to about 100° C. to effect condensation of phenol and aldehyde therein to continuously form resin molecules of higher molecular weight and density greater than the reactants, maintaining said body in a quiescent state to permit continuous settling of the more dense higher molecular weight resin molecules as they are formed into a lower liquid layer of resin and an upper aqueous layer in the reaction vessel, continuously withdrawing the lower resin layer from the reaction vessel at a rate to maintain only a small lower layer relative to the volme of upper aqueous layer in the reaction vessel thereby preventing substantial further reaction of the resin molecules to produce resin molecules of undesirable higher molecular weight, continuously passing said aqueous upper layer into a second enlarged vertical separator-reaction vessel containing a body of liquid wherein unreacted phenol and aldehyde from the upper layer in the first reaction vessel are condensed to produce additional resin, maintaining said body of liquid in said separator-reaction vessel in a quiescent state to permit continuous settling of the more dense higher molecular weight molecules as they are formed into a lower layer of resin in the bottom of the separator-reaction vessel and an upper aqueous layer, passing the lower layer of resin containing admixed therewith some aqueous solution containing unreacted phenol and aldehyde from the first reaction vessel into the separator-reaction vessel wherein separation occurs with the resin settling to the bottom in the lower resin layer and the aqueous solution forming an upper aqueous layer, continuously discharging upper layer from the separator-reaction vessel, continuously withdrawing resin layer from the bottom of the separator-reaction vessel before substantial further reaction of said resin molecules to produce resin molecules of undesirable higher molecular weight occurs, and dehydrating said withdrawn resin to remove water admixed therewith.

5. A process for producing phenoplasts which comprises continuously introducing phenol and an aqueous solution of formaldehyde into a large body of liquid containing said phenol and formaldehyde reactants together with an acid resinification catalyst, maintaining said body of liquid in an enlarged vertical reaction vessel at an elevated temperature from about 65° C. to about 100° C. to effect condensation of phenol and formaldehyde to continuously form resin molecules of higher molecular weight and density greater than the reactants, maintaining said body in a quiescent state to permit continuous settling of the more dense higher molecular weight resin molecules as they are formed into a lower liquid layer of resin and an upper aqueous layer in the reaction vessel, continuously withdrawing the lower resin layer from the reaction vessel at a rate to maintain only a small lower layer relative to the volume of upper aqueous layer in the reaction vessel thereby preventing substantial further reaction of the resin molecules to produce resin molecules of undesirable higher molecular weight, continuously passing said aqueous upper layer into a second enlarged vertical reaction chamber containing a body of liquid wherein unreacted phenol and formaldehyde from the upper layer in the first reaction chamber are condensed to produce additional resin, maintaining said body of liquid in said second reaction chamber in a quiescent state to permit continuous settling of the more dense higher molecular weight molecules as they are formed into a lower layer of resin in the bottom of the second reaction chamber and upper aqueous layer, continuously withdrawing the lower resin layer from the second reaction vessel at a rate to maintain only a small lower layer relative to the volume of upper aqueous layer in the reaction zone thereby preventing substantial further reaction of the resin molecules to produce resin molecules of undesirable higher molecular weight, continuously passing the aqueous upper layer in the second reaction chamber into a third enlarged vertical separator-reaction vessel containing a body of liquid wherein unreacted phenol and formaldehyde from the upper layer in the second reaction chamber are condensed to produce additional resin, maintaining said body of liquid in said separator-reaction vessel in a quescent state to permit continuous settling of the more dense higher molecular weight molecules as they are formed into a lower layer of resin in the bottom of the separator-reaction vessel and an upper aqueous layer, continuously discharging upper aqueous layer from the top of the separator-reaction chamber, continuously withdrawing resin layer from the bottom of the separator-reaction vessel before substantial further reaction of said resin molecules to produce resin molecules of undesirable higher molecular weight occurs, and dehydrating withdrawn resin to remove water admixed therewith.

6. A process for the production of phenoplasts which comprises maintaining a plurality of reaction vessels, each reaction vessel containing an aqueous body of an aldehyde selected from the group consisting of formaldehyde, paraformaldehyde, acetaldehyde, and furfural and a phenol selected from the group consisting of phenol, cresols, xylenols and tar acids at a temperature of at least 65° C. to condense phenol and aldehyde to continuously form resin molecules of molecular weight and density greater than the reactants, maintaining said bodies in a quiescent state to permit continuous settling of the more dense molecules as they are formed into lower liquid layers of resin and upper aqueous layers in the reaction vessels, introducing a phenol and an aldehyde into the first reaction vessel, passing upper aqueous layer from each reaction vessel to the succeeding reaction vessel, discharging upper aqueous layer from the last reaction vessel, and withdrawing the resin in the lower layers from the reaction vessels before substantial further reaction of the resin molecules to produce resin molecules of undesirable higher molecular weight occurs.

7. A continuous process for the production of phenoplasts which comprises maintaining a plurality of reaction vessels, each reaction vessel containing an aqueous body of phenol and formaldehyde and an acid resinification catalyst at a temperature of at least 65° C. to condense phenol and formaldehyde to continuously form resin molecules of molecular weight and density greater than the reactants, maintaining said bodies in a quiescent state to permit continuous settling of the more dense molecules as they are formed into lower liquid layers of resin and upper aqueous layers in the reaction vessels, continuously introducing phenol and an aqueous solution of formaldehyde into the first reaction vessel, continuously passing upper aqueous layer from each reaction vessel to the succeeding reaction vessel, continuously discharging upper aqueous layer from the last reaction vessel, continuously withdrawing resin in the lower layers before substantial further reaction of the resin molecules to produce resin molecules of undesirable higher molecular weight occurs, and dehydrating said withdrawn resin to remove water admixed therewith.

8. In a process for the production of phenoplasts by condensation of phenol with formaldehyde, the improvement which comprises maintaining a mixture of phenol and formaldehyde and an acid resinification catalyst in a reaction zone at an elevated temperature from about 65° C. to about 100° C. to continuously effect formation of resin of molecular weight and density greater than the reactants, continuously maintaining said mixture in a quiescent state to permit continuous settling of the more dense molecules as they are formed into a lower layer of resin in the bottom of the reaction zone separating said resin as it forms in the reaction zone, and withdrawing said resin in the lower layer from the reaction zone before substantial further reaction of said resin to produce resin molecules of undesirable molecular weight occurs.

References Cited in the file of this patent

UNITED STATES PATENTS

| | | |
|---|---|---|
| 1,660,403 | Turkington | Feb. 28, 1928 |
| 2,616,872 | Bloem et al. | Nov. 4, 1952 |
| 2,658,054 | Coleman et al. | Nov. 3, 1953 |

OTHER REFERENCES

Robitschek et al.: Phenolic Resins, page 80, published by Iliffe and Sons Ltd. (1950)